United States Patent
Van Den Berg et al.

(10) Patent No.: US 7,882,802 B2
(45) Date of Patent: *Feb. 8, 2011

(54) DEVICE AND METHOD FOR DETERMINING TEAT POSITIONS

(75) Inventors: Karel Van Den Berg, Bleskensgraaf (NL); Eduard Meijer Lodewijk, The Hague (NL); Cornelis Antonius Maria Snijders, Teteringen (NL); Geert Cornelis Steen, Maasland (NL)

(73) Assignee: Lely Enterprises AG, Zug (CH)

( * ) Notice: Subject to any disclaimer, the term of this patent is extended or adjusted under 35 U.S.C. 154(b) by 16 days.

This patent is subject to a terminal disclaimer.

(21) Appl. No.: 11/819,045

(22) Filed: Jun. 25, 2007

(65) Prior Publication Data

US 2007/0245964 A1    Oct. 25, 2007

Related U.S. Application Data

(62) Division of application No. 10/952,889, filed on Sep. 30, 2004, now Pat. No. 7,246,571.

(30) Foreign Application Priority Data

Sep. 30, 2003 (NL) .................................. 1024400
Sep. 30, 2003 (NL) .................................. 1024401

(51) Int. Cl.
  *A01J 5/00* (2006.01)
  *A01J 5/007* (2006.01)
(52) U.S. Cl. ................. 119/14.08; 119/14.02; 119/651; 119/670
(58) Field of Classification Search ............... 119/14.08, 119/651, 14.18, 670
See application file for complete search history.

(56) References Cited

U.S. PATENT DOCUMENTS

| | | | | | |
|---|---|---|---|---|---|
| 4,867,103 | A | * | 9/1989 | Montalescot et al. | 119/14.08 |
| 5,979,359 | A | * | 11/1999 | Hansson | 119/14.08 |
| 6,055,930 | A | * | 5/2000 | Stein et al. | 119/14.08 |
| 6,118,118 | A | | 9/2000 | van der Lely et al. | |
| 2003/0097990 | A1 | * | 5/2003 | Bjork et al. | 119/14.08 |

FOREIGN PATENT DOCUMENTS

| | | |
|---|---|---|
| EP | 0232568 | 8/1987 |
| EP | 0323875 | 7/1989 |
| EP | 0329248 | 8/1989 |
| EP | 0535756 | 4/1993 |
| EP | 0736246 | 10/1996 |
| EP | 0824857 | 2/1998 |
| EP | 1279327 | 1/2003 |
| WO | WO96/01040 | 1/1996 |
| WO | WO96/20587 | 7/1996 |
| WO | WO98/44782 | 10/1998 |
| WO | WO00/62602 | 10/2000 |

* cited by examiner

*Primary Examiner*—Son T. Nguyen
(74) *Attorney, Agent, or Firm*—David P. Owen; Coraline J. Haitjema; Howrey LLP

(57) ABSTRACT

A device for determining the teat positions of a dairy animal after milking. The device is provided with at least one position-measuring device for determining a position of a teat prior to the milking of the dairy animal and for emitting a position signal corresponding to the teat position. The position-measuring device generates individual teat position signals and a control unit determines on the basis of the teat position signals determined before the milking, planes of symmetry extending substantially parallel to the teats. The expected positions are calculated with respect to the planes of symmetry.

32 Claims, 6 Drawing Sheets

DEVICE AND METHOD FOR DETERMINING TEAT POSITIONS

CROSS REFERENCE TO RELATED APPLICATIONS

This application is a divisional application of U.S. Pat. Ser. No. 10/952,889, filed Sep. 30, 2004, now U.S. Pat. No. 7,246,571 the contents of which are hereby incorporated by reference in their entirety. It claims priority from Dutch application numbers NL1024401 and 1024400 both filed on 30 Sep. 2003, the contents of which are hereby also incorporated by reference in their entirety.

BACKGROUND OF THE INVENTION

1. Field of the Invention

The invention relates generally to devices for performing operations on dairy animals and in particular devices for performing operations on the teats of such animals. The invention further relates to methods of performing operations on dairy animals and in particular to methods for determining the positions of the teats.

2. Description of the Related Art

Devices are known for applying fluids to the teats of dairy animals. Such devices may comprise a spraying element disposed on a robot arm for automated operation. After a dairy animal has been milked, a control unit may move the spraying element to a fluid application position. In said fluid application position, a fan-shaped spray pattern of the activated spraying element is caused to just touch the rear side of the udder of the animal that has been milked. The control signals for bringing the spraying element to the fluid application position may be generated by a sensor or may be based on animal related co-ordinates that have been inputted into a memory of the control unit. A device of this type is known from European patent application No. EP-0535754 B1. Although such known devices may generally function properly, it is however sometimes desirable to apply fluid to each teat on an individual basis.

There is thus a particular need for a device for applying a fluid after a dairy animal has been milked, whereby the fluid can be applied to each teat individually, so that reduced fluid consumption will be attainable.

Devices are also known for determining the positions of individual teats. Such devices may be used prior to milking to localize the teats for attachment of teat cups by a robotic milking device. Due to the reduction in volume of the cow's udder, after milking the teats will no longer be located at the positions identified prior to milking. For further post-milking treatment of the individual teats, their positions would need to be determined once more.

BRIEF SUMMARY OF THE INVENTION

The present invention addresses these problems according to the invention by providing a device for determining the expected teat positions of a dairy animal after milking thereof comprising; a position-measuring device for determining pre-milking positions of the teats prior to the milking of the dairy animal; and a computing device for computing expected post-milking positions for the teats on the basis of the pre-milking positions. The invention is based on the insight that, contrary to expectations, a position measurement prior to the milking will suffice and that it will nevertheless be possible to obtain proper fluid application without requiring a further measurement procedure.

According to a preferred embodiment of the invention, the computing device comprises an algorithm for determining the post-milking teat positions by locating a point of symmetry of at least two teats and scaling a distance from the pre-milking teat positions to the point of symmetry. In this context, point of symmetry is also understood to include lines and planes of symmetry. Thus the point of symmetry may be the point of symmetry lying centrally between all four teats. Equally, it may be a point lying between two teats. In a preferred embodiment it has been found that using the plane of symmetry between the left and right teat pairs provides sufficient accuracy for locating the teats after milking.

According to a particular embodiment, for a dairy animal having a left rear teat, a right rear teat, a left front teat and a right front teat, the device may comprise a position-measuring device for determining the positions of the teats prior to the milking of the dairy animal and for generating individual teat position signals corresponding to the individual teat positions; and a control unit for determining, on the basis of the four teat position signals determined before the milking, a first centre between the left teats, a second centre between the right teats, a third centre between the rear teats and a fourth centre between the front teats, for determining a first plane of symmetry comprising the first and the second centre, and for determining a second plane of symmetry comprising the third and the fourth centre, the planes of symmetry extending at least substantially parallel to the teats. By means of the reference system obtained by the planes of symmetry between the teats of the dairy animal and by choosing a geometric reference connected to the stationary world, such as for example a plane of symmetry of a milking parlor, the teat positions of the dairy animal after the milking can be calculated and the control unit is capable of moving e.g. a fluid-applying device, comprising a fluid-applying member, from an inoperative position to a fluid application position for every teat for performing the application of the fluid.

The invention is furthermore based on the insight that the animal related reference system is not only suitable for applying fluid, but also for performing other animal related actions on the dairy animal after the milking.

In an embodiment of a device according to the invention, the control unit is suitable for determining a distance to the first plane of symmetry and/or a distance to the second plane of symmetry. Consequently, the first plane of symmetry and/or the second plane of symmetry now function(s) as reference plane(s). A reference system relative to the dairy animal is very suitable for an exact positioning of an action member relative to the dairy animal.

In a further embodiment of a device according to the invention, the control unit is suitable for performing as an algorithm a multiplication of the distance by a factor for obtaining an arithmetically operated position signal. For treating for example the teats of a dairy animal after the milking the teat positions relative to the planes of symmetry are required. It has been found that with certain cows or cow species a small change in the teat position occurs during the milking. By performing an arithmetic operation said change can be determined immediately after the measurement before the milking, so that another measurement after the milking is not necessary.

In a further embodiment of a device according to the invention, the distance is a perpendicular distance between an individual teat position and a relevant plane of symmetry. In a further embodiment of a device according to the invention, the mentioned factor is lying between approximately 0.7 and approximately 0.95. Such a multiplication factor appears to indicate accurately the change of the teat positions for almost all cows and cow species during the milking.

In an embodiment of a device according to the invention, the device is provided with an animal identification system for determining an animal identity, the animal identification system being connected to the control unit. The control unit, comprising a calculating device, is preferably suitable for performing various arithmetic operations and for selecting one of the arithmetic operations on the basis of the determined animal identity. This makes it possible to select an algorithm, for example a multiplication factor, per dairy animal or per animal species or per group of dairy animals.

In an embodiment of a device according to the invention, the device is provided with an animal related action device comprising an action member for performing an animal related action on the dairy animal after the milking, the control unit controlling the animal related action device. An action member may be a device for applying a fluid after a dairy animal has been milked. Other possible action members are capable of performing various functions: cleaning, brushing, shaving, inspecting, viewing, detecting, analysing, massaging, skin-treatment and the like are only a few of the many possibilities. The functions can be performed on a teat, an udder and more in general on the entire dairy animal.

In an embodiment of a device according to the invention, the device comprises one or more action members, constituted for example by fluid-applying members, belonging to the group consisting of: brush, roller, spraying element, dipping device, teat-treatment cup. Teat-treatment cups comprise an inner space for receiving a teat. In case of a teat-treatment cup which has been connected to a teat of the dairy animal and which has been activated, a teat-treatment fluid (a skin conditioner, air for forced drying of a teat, a sun lotion, a softener, an antiseptic fluid, iodine, glycerol and the like, or combinations of the aforementioned fluids) are supplied to the inner space. A teat-treatment cup may also be designed in such a way that it can also function as a pre-milking device. An action member is included in an action device and may be completely integrated therein. Action members are neither limited to the application of a fluid, nor to the performance of a teat related action in the restricted sense. They can be used in the broad sense for performing any possible (automatically) performable animal related action on the dairy animal.

In an embodiment of a device according to the invention, the action member, comprising a fluid-applying member, comprises a first and a second brush or roller, which are each rotatable about an at least substantially horizontal first axis respectively second axis, the first and the second axis extending at least substantially parallel to each other, a teat-receiving space for receiving the teat being provided between the two brushes. An extremely correct positioning of the brushes or rollers is achieved if a teat detector being present comprises a main detecting direction, which main detecting direction is arranged or is capable of being arranged at least substantially parallel to a horizontal axis.

In an embodiment of a device according to the invention, the action member, comprising a fluid-applying member, comprises a spraying element controlled by the control unit and rotatable about an axis extending through the longitudinal direction of the teat. In this manner it can be achieved that fluid is applied to the entire external surface of the teat.

In an embodiment of a device according to the invention, the action member, comprising a fluid-applying member, comprises at least three spraying elements disposed about an axis extending through the longitudinal direction of the teat. In this manner it can be achieved that fluid is applied to the entire external surface of the teat.

In an embodiment of a device according to the invention, the device is provided, besides an action device, with a connection device for connecting a teat cup to the teat of the dairy animal, the control unit controlling the connection device. The animal related action device may constitute part of an independent dairy-animal-treatment device. In a preferred embodiment, the action device is integrated or included in a device which is also provided with a connection device for (automatically) connecting a teat cup to the teat of the dairy animal. Milking and subsequently performing an animal related action is favorable in the time-technical sense.

In an embodiment of a device according to the invention, the control unit comprises an input device for inputting animal related action data per animal, and with a memory for containing animal related action data per animal. In this manner the animal related action data can be altered and/or inputted according to one's wishes. The action data may contain in a manner known per se the lactation stage, milk yield data and the like.

In an embodiment of a device according to the invention, the control unit is suitable for controlling, with the aid of the arithmetically operated position signal, a movement of the animal related action device from an inoperative position to an operative position after the milking, and for controlling the action member in the latter position. If the action member is for example a fluid-applying member, the control of the action member comprises for example the adjustment of the spatial angle of the fluid-applying member (the angle under which the fluid is applied to a part of the dairy animal), the spatial fluid pattern, the fluid outflow behavior from the fluid-applying member, and the like.

In an embodiment of a device according to the invention, the device is provided with a parameter detector for determining an animal related parameter and for emitting a parameter signal corresponding to the determined animal related parameter, and the control unit is suitable for controlling, partially with the aid of the parameter signal, a connection device for connecting a teat cup to the teat of the dairy animal, and/or for controlling, partially with the aid of the parameter signal, a movement of an animal related action device, comprising an action member for performing an animal related action on the dairy animal after the milking, from an inoperative position to an operative position after the milking and for controlling the action member. It is pointed out here that by "animal related parameter" no position parameter is meant within the scope of the context.

In an embodiment of a device according to the invention, the parameter detector comprises an animal identification system for determining an animal identity and for emitting an animal identity signal as a parameter signal. In this manner, if a fluid-applying member is used as an action member, an individual application of the fluid can be performed per animal.

In an embodiment of a device according to the invention, the parameter detector comprises a teat condition detector for detecting a teat condition of the teat and for emitting a teat condition signal as a parameter signal. Such a teat condition signal may be used inter alia for applying fluid in dependence on the teat condition. Thus it is possible for example that, when the teat condition signal indicates that the teat is in good condition and the action member is a fluid-applying member, the control unit omits to apply fluid to the teat, which is both time-saving and fluid-saving.

In an embodiment of a device according to the invention, the parameter detector of the device comprises a teat orifice condition detector for detecting a teat orifice condition of an orifice of the teat and for emitting a teat orifice condition signal as a parameter signal, and the control unit is suitable for controlling, partially with the aid of the teat orifice condition signal, a connection device for connecting a teat cup to the teat of the dairy animal, and/or for controlling, partially with the aid of the teat orifice condition signal, a movement of an animal related action device, comprising an action member for performing an animal related action on the dairy animal after the milking, from an inoperative position to an operative position after the milking and for controlling the action member. Such a teat orifice condition signal may be used inter alia for applying fluid in dependence on the teat orifice condition, which may differ from the teat condition. Thus it is possible for example that, when the teat orifice condition signal indicates that the teat orifice is in good condition, the control unit omits to apply fluid to the teat, which is both time-saving and fluid-saving. When on the contrary the teat orifice is in bad condition, it is possible for the control unit to select a highly thorough and accurate way of applying the fluid.

In an embodiment of a device according to the invention, the device is provided with an action detector for detecting the functioning of the action member, which detector is connectable to the control unit.

In an embodiment of a device according to the invention, the device is provided with an picture-recording device, for example a camera, for recording a picture of a part of the dairy animal on which an animal related action has been performed and with a computer loaded with image-comparing software for comparing the recorded picture with a previously stored reference criterion and for emitting a comparison signal which is indicative of the comparison result, and in that the control unit is suitable for controlling, partially with the aid of the comparison signal, a movement of an animal related action device, comprising an action member for performing an animal related action on the dairy animal after the milking, from an inoperative position to an operative position after the milking and for controlling the action member and/or activating a warning signal. By means of the above-described action detector, comprising the image-recording device, it is possible to check for example the application of the fluid, so that, in case of insufficient presence or absence of fluid on a teat, it is possible to take action according to one's wishes. In this manner it is not only possible to improve the health of the teat but also to increase the milk yield of the dairy animal. In an alternative or additional embodiment of a device according to the invention, the action detector is provided with a laser apparatus for directing a laser beam to the relevant part of the dairy animal, for example a teat, with a laser beam detector for detecting/observing the laser beam reflected by the relevant part of the dairy animal and for emitting a laser beam signal, and with a computer loaded with laser-beam-comparing software for comparing the laser beam signal with a previously stored reference criterion and for emitting a comparison signal which is indicative of the comparison result. These embodiments of action detectors have appeared to be extremely efficient in determining the presence of fluid on a teat. However, it will be obvious that also other action detectors (comprising fluid detectors), may be applied within the scope of the invention, for example action detectors transmitting ultrasonic or infrared signals. In an embodiment of a device according to the invention, the action detector and the image-recording device are integrated. Alternatively, the action detector and the laser apparatus are integrated.

In an embodiment of a device according to the invention, the device is provided with a spraying device for applying a fluid to the teat of a dairy animal by spraying. Spraying of fluid appears to be a reproducible way of applying the fluid.

In an embodiment of a device according to the invention, the device is provided with a spraying device, comprising a spraying element for applying a fluid to the teat of the dairy animal by spraying, and the device is provided with a spray pattern detector as an action detector for detecting a spray pattern originating from the spraying device, and for emitting a spray pattern signal, and the control unit is suitable for controlling, partially with the aid of the spray pattern signal, a movement of the spraying device from an inoperative position to a spraying position after the milking and for controlling the spraying element and/or activating a warning signal. Spraying of fluid appears to provide a reproducible way of applying the fluid. In an embodiment of a device according to the invention, the spray pattern detector and the image-recording device are integrated. In an alternative embodiment of a device according to the invention, the spray pattern detector and the laser apparatus are integrated.

In an embodiment of a device according to the invention, the device is suitable for applying fluids with different chemical and/or physical properties, the control unit selecting a fluid to be applied having a particular chemical and/or physical property. The application of several fluids during one application action is possible. Fluids may be applied successively in a certain sequence and/or in combination.

In an embodiment of a device according to the invention, the device comprises a heating and/or cooling device for setting the temperature of the fluid to be applied. Said cooling device may take into account for example the ambient temperature or the determined animal identity for setting the temperature.

In an embodiment of a device according to the invention, the device for applying a fluid to a teat of a dairy animal is a device for applying a disinfectant fluid to a teat of a dairy animal. In particular when disinfecting teats it is of utmost importance to be able to detect the presence of disinfectant fluid to the teat to be able to demonstrate that the disinfection has been carried out correctly. Alternatively or additionally, the device for applying a fluid to a teat of a dairy animal is a device for applying a cleaning fluid to a teat of a dairy animal. In particular when cleaning teats it is of utmost importance to be able to detect the presence of cleaning fluid to the teat to be able to demonstrate that the cleaning has been carried out correctly.

In an embodiment of a device according to the invention, the device comprises a teat top detector for detecting the top of a teat, which is integrated in a fluid detector serving as an action detector for detecting the fluid application distance, measured from the top of the teat, over which the fluid has been applied to the teat, and for emitting a fluid signal comprising data in relation to the determined fluid application distance and controlling the fluid-applying member partially with the aid of the fluid signal. The fluid detector comprises a computer loaded with image-comparing software for comparing the determined fluid application pattern with a previously stored reference criterion, for emitting a comparison signal which is indicative of the comparison result and for determining the teat length, the top of the teat, and the fluid application distance, measured from the top of the teat, over which the fluid has been applied to the teat, and for emitting a fluid signal comprising data in relation to the determined fluid application distance. By means of the fluid signal it is possible to control the action member and/or to activate a warning signal. This makes it possible to determine the presence of fluid on at least the teat top comprising the orifice of the teat and an area of some magnitude thereabove. The fluid may be for example a disinfectant and/or cleaning fluid. The control unit is now suitable for controlling, partially with the aid of the fluid signal, the fluid-applying member during or after a first application of the fluid to a teat of the dairy animal, as well as during or after a following application next to the first application. By means of the fluid detector it is possible to check the application of the fluid, so that in case of insufficient presence or absence of a fluid on a teat it is possible to take action according to one's wishes. In this manner it is not only possible to improve the health of the teat, but also to increase the milk yield of the dairy animal. The fluid-applying area is not limited to a teat, but comprises in principle the entire dairy animal.

In an embodiment of a device according to the invention, the device is provided with a fluid detector for recording an image of a part of the dairy animal on which the application of the fluid has been carried out and with a computer loaded with image comparing software for comparing the recorded image with a previously stored reference criterion, such as a threshold distance. Said threshold distance may be inputted beforehand and may be adjustable, if desired, in order to accept a desired degree of fluid application as sufficient. In most cases it has been found that a threshold distance of approximately ⅔ of the teat length is a correct criterion to decide whether a sufficient amount of fluid has been applied. In the foregoing the term fluid application distance may also be read as fluid application external surface. In an embodiment of a device according to the invention, the fluid detector and the image-recording device are integrated. Alternatively, the fluid detector and the laser apparatus are integrated.

In order to be able to detect correctly the presence of fluid on the teat, in a non-shown embodiment of a device according to the invention, the device is provided with a colorant-adding device for adding a colorant to the fluid, and with a fluid detector, which fluid detector comprises a color-measuring device for measuring a or the color of the teat and for emitting a color signal possibly forming at least a part of the fluid signal. The control unit is suitable for controlling the fluid-applying member and/or fluid-applying device partially with the aid of the color signal. The detection of the presence of fluid can take place in an accurate and simple manner by color measurement. In an embodiment of a device according to the invention, the color-measuring device and the image-recording device are integrated. Alternatively, the color-measuring device and the laser apparatus are integrated.

In an embodiment of a device according to the invention, the device is provided with a glossy-substance-adding device for adding a glossy substance to the fluid, and with a fluid detector, which fluid detector comprises a gloss-measuring device for measuring a or the gloss of the teat and for emitting a gloss signal forming at least a part of the fluid signal. The control unit is suitable for controlling the fluid-applying member and/or fluid-applying device partially with the aid of the gloss signal. The detection of fluid can thus take place in a simple manner by detecting the gloss. In an embodiment of a device according to the invention, the gloss-measuring device and the image-recording device are integrated. In an alternative embodiment, the gloss-measuring device and the laser apparatus are integrated. Viewed in a larger context it is obvious that all substances that improve the detection of fluid applied to a part of the dairy animal are applicable in an embodiment of a device according to the invention.

In an embodiment of a device according to the invention, the fluid detector comprises a drop detector for detecting a drop of the fluid on the top of the teat of the dairy animal and for emitting a drop signal possibly forming at least a part of the fluid signal. The control unit is suitable for controlling the fluid-applying member and/or fluid-applying device partially with the aid of the drop signal. From the presence of a drop hanging from the teat top it can be deduced that the fluid has been applied correctly to the teat. In particular when disinfecting and cleaning teats it is of utmost importance to be able to detect the presence of the relevant fluid on the teat in order to be able to demonstrate that the disinfection or cleaning has been carried out correctly. In an embodiment of a device according to the invention, the drop detector and the image-recording device are integrated. In an alternative embodiment, the drop detector and the laser apparatus are integrated.

In an embodiment of a device according to the invention, the aforementioned parameter detector and the image-recording device are integrated. Alternatively, the parameter detector and the laser apparatus are integrated. In an embodiment of a device according to the invention, for example the aforementioned teat condition detector (and/or the teat orifice condition detector) and the image-recording device are thus integrated. In an alternative embodiment, the teat condition detector (and/or the teat orifice condition detector) and the laser apparatus are integrated.

In an embodiment of a device according to the invention, the device is provided with a stock detector, which serves as an action detector, for detecting the stock of fluid and for emitting a stock signal. Said stock signal may be used as an indication that the stock has to be replenished.

In an embodiment of a device according to the invention, the spraying device comprises a spraying line and the stock detector serves as the action detector. suitable for detecting a stock of fluid in the spraying line. In this manner it is possible to check whether fluid is flowing through the spraying line. Both detectors may be present in one and the same direction.

In an embodiment of a device according to the invention, the device is provided with a teat detector for detecting the teat and for emitting a teat signal possibly forming at least a part of the fluid signal. Such a teat detector only needs to be able to detect the teat and does not have to determine particular properties of the teat or its position. In particular if the data from the aforementioned spray pattern detector and the teat detector are combined, it is possible to determine whether the spray pattern actually reaches the teat.

In an embodiment of a device according to the invention, the teat detector is provided with a position-measuring device for measuring the position of the teat and for emitting a teat position signal possibly forming at least a part of the fluid signal. Such a teat position signal may be used for example for moving the fluid-applying device accurately to the teat and at the same time for controlling the fluid-applying member. An accurate application while using a small amount of fluid is now possible. In an embodiment of a device according to the invention, the teat detector and the image-recording device are integrated. In an alternative embodiment, the teat detector and the laser apparatus are integrated.

In an embodiment of a device according to the invention, the parameter detector, the action detector, the teat detector and the image-recording device are integrated individually or in a chosen combination. Alternatively, the parameter detector, the action detector, the teat detector and the laser apparatus are integrated individually or in a chosen combination.

In an embodiment of a device according to the invention, the control unit is suitable for controlling in various ways of performing an action member for performing an animal related action on the dairy animal and is suitable for selecting one of the ways of performing with the aid of the position signal, the arithmetically operated position signal, the parameter signal (such as the teat condition signal and the teat orifice condition signal), the spray pattern signal, the comparison signal, the fluid signal or combinations of the aforementioned signals. In case the action member is for example a fluid-applying member, such a way of performing may comprise choosing a proper application time of the fluid, raising the fluid application pressure, choosing an other fluid, tilting, rotating or otherwise positioning a fluid-applying member connected to a possible arm (or integrated) in such a way that the flow of fluid originating from an activated fluid-applying member can be led in all spatial directions. It is pointed out that besides the already mentioned signals also other suitable signals are possible within the scope of the invention.

In case of selecting one of the ways of performing with the aid of the teat position signal may be taken into account for example tilting a spraying member or increasing a spraying pressure in dependence on the measured position. In case of selecting one of the ways of performing with the aid of the teat condition signal or the teat orifice condition signal, for example the selection of a prolonged application time or a different fluid may be taken into consideration.

In an embodiment of a device according to the invention, the control unit is suitable for selecting, with the aid of the position signal, the arithmetically operated position signal, the parameter signal (such as the teat condition signal and the teat orifice condition signal), the spray pattern signal, the comparison signal, the fluid signal or combinations of the aforementioned signals, a way of performing that comprises the repeat performance of an animal related action on the dairy animal in the same way of performing. If the animal related action relates for example to the application of a fluid, it is possible to repeat the application if the signal indicates that insufficient fluid has been applied at a previous application. It is pointed out that besides the already mentioned signals also other suitable signals are possible within the scope of the invention.

In an embodiment of a device according to the invention, the control unit is suitable for selecting, with the aid of the position signal, the arithmetically operated position signal, the parameter signal (such as the teat condition signal and the teat orifice condition signal), the spray pattern signal, the comparison signal, the fluid signal or combinations of the aforementioned signals, a way of performing that comprises first performing, at least once, an animal related action on the dairy animal in a first way of performing and subsequently performing, at least once, an animal related action on the dairy animal in a second way of performing, the first and the second way of performing differing from each other. If the animal related action relates for example to the application of a fluid, it is possible to repeat the application if the signal indicates that insufficient fluid has been applied at a previous application. The first way of performing may be for example a standard applying step in which fluid is applied in a standard manner, whereas the second way of performing comprises for example first determining the position of the teat and moving the fluid-applying member to the teat on the basis of the determined position, for increasing the chance that the fluid gets on the teat. It is pointed out that besides the already mentioned signals also other suitable signals are possible within the scope of the invention.

The invention also relates to a method of determining the expected teat positions of a dairy animal after milking thereof, the method comprising determining pre-milking teat positions of the individual teats of the dairy animal prior to milking; milking the dairy animal; and calculating on the basis of the pre-milking teat positions, post-milking teat positions corresponding to the expected positions of the teats after milking. Preferably, the post-milking teat positions are calculated by scaling a distance from the pre-milking teat positions to a point of symmetry.

According to a preferred embodiment of the invention, there is disclosed a method of determining the expected teat positions of a dairy animal after milking thereof, the dairy animal having a left rear teat, a right rear teat, a left front teat and a right front teat, wherein the method comprises: determining a position of individual teats prior to the milking of the dairy animal; emitting position signals corresponding to the individual teat positions; determining, on the basis of the four teat position signals determined before the milking, a first centre between the left teats, a second centre between the right teats, a third centre between the rear teats and a fourth centre between the front teats; determining a first plane of symmetry comprising the first and the second centre; and determining a second plane of symmetry comprising the third and the fourth centre, the planes of symmetry extending at least substantially parallel to the teats.

In an embodiment of a method according to the invention, the method comprises the step of determining a distance to the first plane of symmetry and/or a distance to the second plane of symmetry In an embodiment of a method according to the invention, the method comprises the step of performing as an algorithm a multiplication of the distance by a factor for obtaining an arithmetically operated position signal.

In an embodiment of a method according to the invention, the distance is a perpendicular distance between an individual teat position and a relevant plane of symmetry.

In an embodiment of a method according to the invention, the factor is lying between approximately 0.7 and approximately 0.95.

In an embodiment of a method according to the invention, the method comprises the step of determining an animal identity.

In an embodiment of a method according to the invention, the method comprises the step of selecting, on the basis of the determined animal identity, one arithmetic operation from various arithmetic operations possibly to be performed.

In an embodiment of a method according to the invention, the method comprises the step of performing an animal related action on the dairy animal after the milking.

In an embodiment of a method according to the invention, the method comprises the step of using one or more action members, constituted for example by fluid-applying members, belonging to the group consisting of: brush, roller, spraying element, dipping device, teat-treatment cup.

In an embodiment of a method according to the invention, the method comprises the step of using an action member, comprising a fluid-applying member, which consists of a first and a second brush or roller, which are each rotatable about an at least substantially horizontal first axis respectively second axis, the first and the second axis extending at least substantially parallel to each other, a teat-receiving space for receiving the teat being provided between the two brushes.

In an embodiment of a method according to the invention, the method comprises the step of using a spraying element controlled by the control unit and rotatable about an axis extending through the longitudinal direction of the teat.

In an embodiment of a method according to the invention, the method comprises the step of using a fluid-applying member comprising at least three spraying elements disposed about an axis extending through the longitudinal direction of the teat.

In an embodiment of a method according to the invention, the method comprises the step of connecting a teat cup to the teat of the dairy animal.

In an embodiment of a method according to the invention, the method comprises the step of inputting animal related treatment data per animal into a control unit, and the step of storing the animal related treatment data per animal in a memory.

In an embodiment of a method according to the invention, the method comprises the step of controlling, with the aid of the arithmetically operated position signal, a movement of the animal related action device from an inoperative position to an operative position after the milking, and the step of controlling the action member in the latter position.

In an embodiment of a method according to the invention, the method comprises the step of determining an animal related parameter, the step of emitting a parameter signal corresponding to the determined animal related parameter, the step of controlling, partially with the aid of the parameter signal, a connection device for connecting a teat cup to the teat of the dairy animal and/or the step of controlling, partially with the aid of the parameter signal, a movement of an animal related action device, comprising an action member for performing an animal related action on the dairy animal after the milking, from an inoperative position to an operative position after the milking, and the step of controlling the action member.

In an embodiment of a method according to the invention, the method comprises the step of determining an animal related parameter, said step comprising the determination of an animal identity, and the step of emitting an animal identity signal as a parameter signal.

In an embodiment of a method according to the invention, the method comprises the step of determining an animal related parameter, said step comprising the detection of a teat condition of a teat, and the step of emitting a teat condition signal as a parameter signal.

In an embodiment of a method according to the invention, the method comprises the step of detecting a teat orifice condition of an orifice of the teat, the step of emitting a teat orifice condition signal as a parameter signal, the step of controlling, partially with the aid of the teat orifice condition signal, a connection device for connecting a teat cup to the teat of the dairy animal, and/or the step of controlling, partially with the aid of the teat orifice condition signal, a movement of an animal related action device, comprising an action member for performing an animal related action on the dairy animal after the milking, from an inoperative position to an operative position after the milking, and the step of controlling the action member.

In an embodiment of a method according to the invention, the method comprises the step of detecting the functioning of the action member.

In an embodiment of a method according to the invention, the method comprises the step of recording an image of a part of the dairy animal on which an animal related action has been performed, the step of comparing the recorded image with a previously stored reference criterion, the step of emitting a comparison signal which is indicative of the comparison result, the step of controlling, partially with the aid of the comparison signal, a movement of an animal related action device, comprising an action member for performing an animal related action on the dairy animal after the milking, from an inoperative position to an operative position after the milking, the step of controlling the action member and/or the step of activating a warning signal.

In an alternative or additional embodiment of a method according to the invention, the method comprises the step of directing a laser beam to a part of the dairy animal on which an animal related action has been performed, the step of detecting the laser beam reflected by the relevant part of the dairy animal, the step of emitting a laser beam signal, the step of comparing the laser beam signal with a previously stored reference criterion, the step of emitting a comparison signal which is indicative of the comparison result, and the step of controlling, partially with the aid of the comparison signal, a movement of an animal related action device, comprising an action member for performing an animal related action on the dairy animal after the milking, from an inoperative position to an operative position after the milking, the step of controlling the action member and/or the step of activating a warning signal.

In an embodiment of a method according to the invention, the method comprises the step of applying a fluid to the teat of a dairy animal by spraying.

In an embodiment of a method according to the invention, the method comprises the step of applying a fluid to the teat of the dairy animal by spraying by means of a spraying device, the method comprising the step of detecting a spray pattern of the spraying step, the step of emitting a spray pattern signal, the step of controlling, partially with the aid of the spray pattern signal, a movement of the spraying device from an inoperative position to a spraying position after the milking, the step of controlling the spraying element and/or the step of activating a warning signal.

In an embodiment of a method according to the invention, the method comprises the step of selecting a fluid to be applied having a particular chemical and/or physical property from fluids having different chemical and/or physical properties, and the step of applying the fluid.

In an embodiment of a method according to the invention, the method comprises the step of setting the temperature of the fluid to be applied.

In an embodiment of a method according to the invention, the method comprises the step of applying a fluid to the teat of the dairy animal, which step comprises the application of a disinfectant fluid.

In an alternative or additional embodiment of a method according to the invention, the method comprises the step of applying a fluid to the teat of the dairy animal, which step comprises the application of a cleaning fluid.

In an embodiment of a method according to the invention, the method comprises the step of determining a fluid application pattern of the fluid on a teat of the dairy animal, measured from the top of the teat, the step of comparing the determined fluid application pattern with a previously stored reference criterion, the step of emitting a comparison signal which is indicative of the comparison result, the step of controlling, partially with the aid of the comparison signal, a movement of a fluid-applying device, comprising an action member for performing an animal related action on the dairy animal after the milking, from an inoperative position to an operative position after the milking, the step of controlling the action member and/or the step of activating a warning signal.

In an embodiment of a method according to the invention, the method comprises the step of detecting a teat, the top of a teat, the step of determining the distance, measured from the top of the teat, over which a fluid has been applied to the teat, the step of emitting a fluid signal, comprising data in relation to the measured distance, and the step of controlling the fluid-applying member partially with the aid of the fluid signal.

In an embodiment of a method according to the invention, the method comprises the step of comparing the measured fluid application distance, measured from the top of the teat, over which fluid has been applied to the teat with a threshold distance as a reference criterion.

In an embodiment of a method according to the invention, $2/3$ of the measured teat length is taken as a threshold distance.

In an embodiment of a method according to the invention, the method comprises the step of adding a colorant to the fluid, the step of measuring a color of the teat, the step of emitting a color signal, which color signal forms at least a part of the fluid signal, and the step of controlling the fluid-applying member and/or fluid-applying device partially with the aid of the color signal.

In an embodiment of a method according to the invention, the method comprises the step of adding a glossy substance to the fluid, the step of measuring a gloss of the teat, the step of emitting a gloss signal, which gloss signal forms at least a part of the fluid signal, and the step of controlling the fluid-applying member and/or fluid-applying device partially with the aid of the gloss signal.

In an embodiment of a method according to the invention, the method comprises the step of detecting a drop of the fluid on the top of the teat of the dairy animal, the step of emitting a drop signal, which drop signal forms at least a part of the fluid signal, and the step of controlling the fluid-applying member and/or fluid-applying device partially with the aid of the drop signal.

In an embodiment of a method according to the invention, the method comprises the step of detecting the functioning of the fluid-applying member and/or fluid-applying device.

In an embodiment of a method according to the invention, the method comprises the step of detecting a stock of fluid in a spraying line, constituting part of a spraying device, and the step of emitting a spraying line stock signal.

In an embodiment of a method according to the invention, the method comprises the step of detecting the stock of fluid and the step of emitting a stock signal.

In an embodiment of a method according to the invention, the method comprises the step of detecting the teat and the step of emitting a teat signal, which teat signal forms at least a part of the fluid signal.

In an embodiment of a method according to the invention, the method comprises the step of measuring the position of the teat, the step of emitting a teat position signal, the step of controlling a movement of the fluid-applying device partially with the aid of the teat position signal, and the step of controlling the fluid-applying member.

In an embodiment of a method according to the invention, the method comprises the step of selecting, with the aid of the position signal, the arithmetically operated position signal, the parameter signal (such as the teat condition signal and the teat orifice condition signal), the spray pattern signal, the comparison signal, the fluid signal or combinations of the aforementioned signals, one of the ways of performing from different ways of controlling the action member for performing an animal related action on the dairy animal.

In an embodiment of a method according to the invention, the method comprises the step of selecting, with the aid of the position signal, the arithmetically operated position signal, the parameter signal (such as the teat condition signal and the teat orifice condition signal), the spray pattern signal, the comparison signal, the fluid signal or combinations of the aforementioned signals, a way of performing that comprises the repeat performance of an animal related action on the dairy animal in the same way of performing.

In an embodiment of a method according to the invention, the method comprises the step of selecting, with the aid of the position signal, the arithmetically operated position signal, the parameter signal (such as the teat condition signal, the teat orifice condition signal), the spray pattern signal, the comparison signal, the fluid signal or combinations of the aforementioned signals, a way of performing that comprises first performing, at least once, an animal related action on the dairy animal in a first way of performing and subsequently performing, at least once, an animal related action on the dairy animal in a second way of performing, the first and the second way of performing differing from each other

BRIEF DESCRIPTION OF THE DRAWINGS

The features and advantages of the invention will be appreciated upon reference to the following figures of a number of exemplary embodiments of the invention, in which.

The invention will be explained hereinafter in further detail with reference to some embodiments shown in the drawing, in which.

DESCRIPTION OF ILLUSTRATIVE EMBODIMENTS

Figure 1:
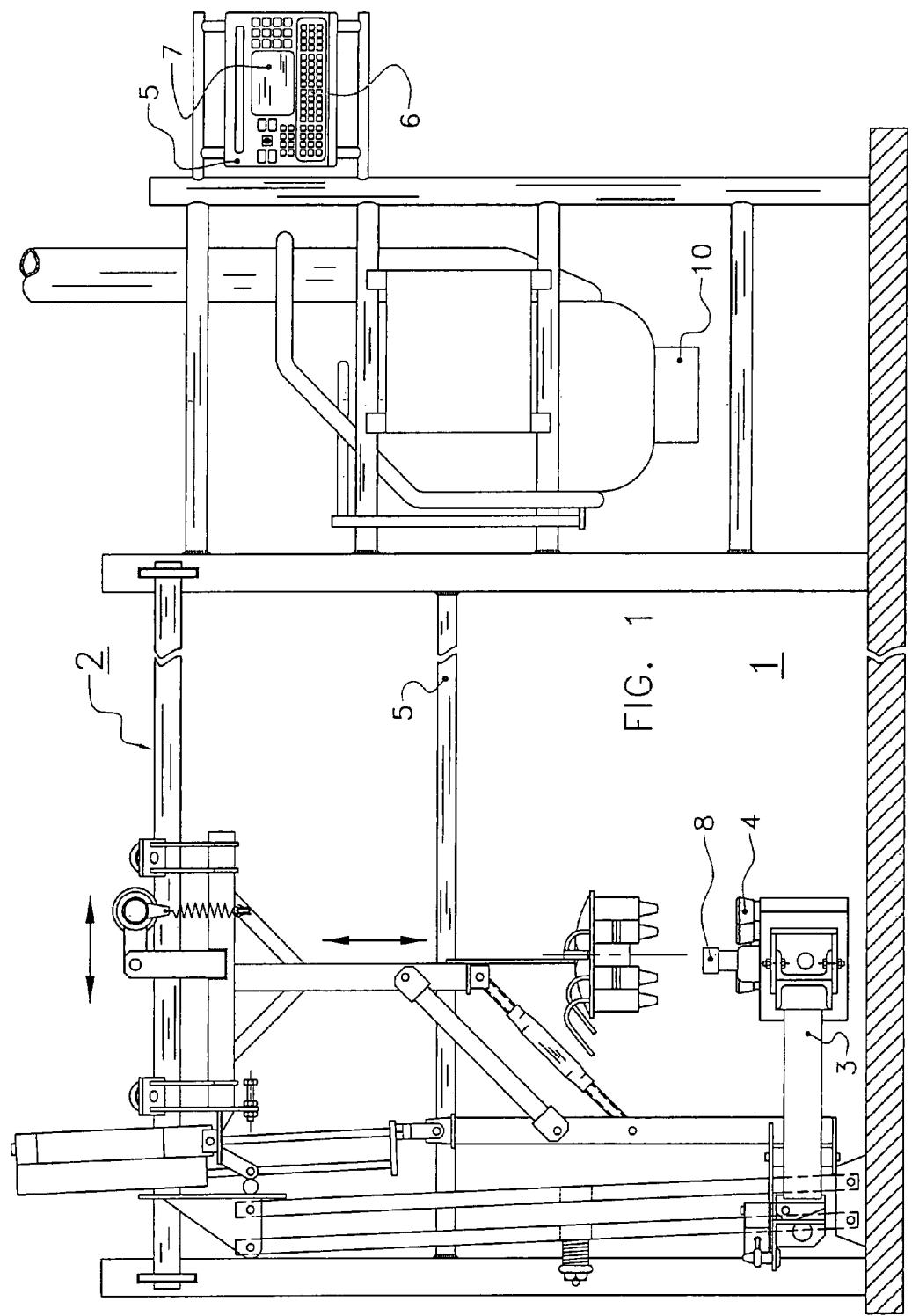
FIG. 1 shows diagrammatically a side view of a device for automatically milking animals, in which a first embodiment of a fluid-applying device with a fluid-applying member according to the invention is present in the form of a spraying element connected to an arm.
Figure 2:
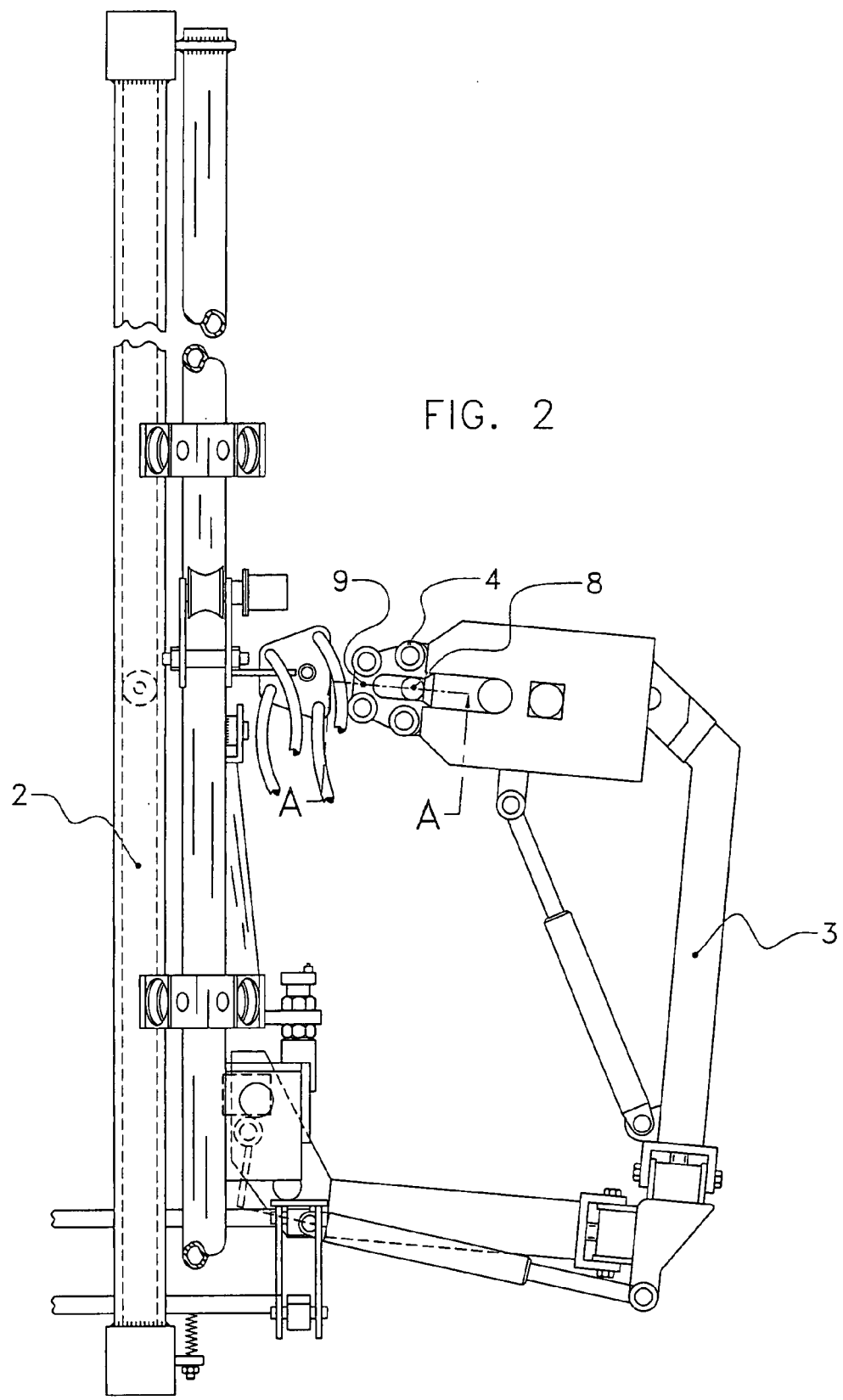
FIG. 2 shows diagrammatically a plan view of a part of the device shown in FIG. 1.

FIGS. 1 and 2 show diagrammatically a device for automatically milking dairy animals. The device comprises a milking parlor 1 surrounded by a fencing 2 that allows a dairy animal, in this embodiment a cow, a limited freedom of movement. The device comprises a robot arm 3 carrying teat cups 4 to be connected to the teats of the cow. The device is controlled by a control unit 5 provided with an input device 6, such as a keyboard, for inputting data and with a screen 7. The control unit 5 comprises a calculating device and a memory. On the robot arm 3 there is also disposed a teat-position-measuring device 8 for measuring the position of the teats of a cow. The data obtained by the teat-position-measuring device 8 are used by the control unit 5 for moving the robot arm 3 in such a way that the teat cups 4 can be connected to the teats. A connection device not shown in detail in FIGS. 1 and 2 and present on the robot arm 3 is suitable for connecting a teat cup to a teat of a dairy animal. Such a device is known per se and will not be described here in further detail. It will be obvious that all kinds of position-measuring devices 8 known per se, comprising for example lasers, cameras, ultrasonic sensors and the like, may be applied within the scope of the invention, for generating teat position signals in co-operation with the control unit 5. In the embodiment shown, the robot arm carries both the teat cups and the position-measuring device, but it will be obvious that there may also be applied a robot arm with a gripper for gripping teat cups from a storage space. In an alternative embodiment, the position-measuring device may also be arranged on a separate robot arm or in a fixed place inside or outside the milking parlor 1 or be integrated in the robot arm. There is disposed an animal identification system 10 near the milking parlor 1 for recognizing the identity of a cow present in the milking parlor 1.

As shown in FIG. 2, there is provided between the front teat cups a fluid-applying device 9 for applying a fluid to the teats of a cow. In the embodiment shown, the fluid-applying member 9 is designed as a spraying element. Such a spraying element 9 may be used for applying a fluid (for example a cleaning fluid) prior to the connection of teat cups, i.e. prior to the milking, but may also be used for applying a fluid (for example a disinfectant fluid) after the disconnection of the teat cups, i.e. after the milking. It is pointed out here that within the scope of the invention by milking is meant the drawing of milk during a milking run when the teat cups are connected to the teats. Although the invention will be described with reference to a fluid-applying device disposed on the same robot arm as the teat cups and the position-measuring device, it will be obvious that the fluid-applying device may also be disposed on a separate robot arm or be integrated in the arm.

Figure 3:
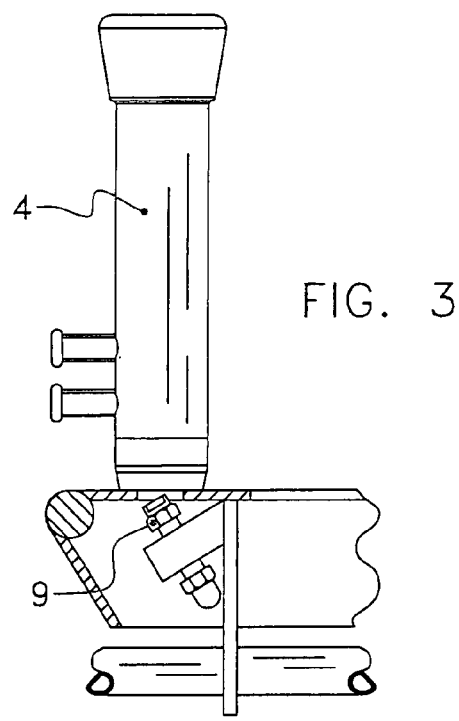
FIG. 3 shows diagrammatically a cross-sectional view according to the line A-A in FIG. 2.

FIG. 3 shows in more detail the position of the spraying element 9 between the teat cups. The spraying element 9 is positioned in such a way that an atomization pattern of the fluid is directed forwardly and upwardly relative to the end of the robot arm 3. Because of the internal constructive design of the spraying element the fluid to be sprayed leaves the spraying element in a conical pattern.

Figure 4:
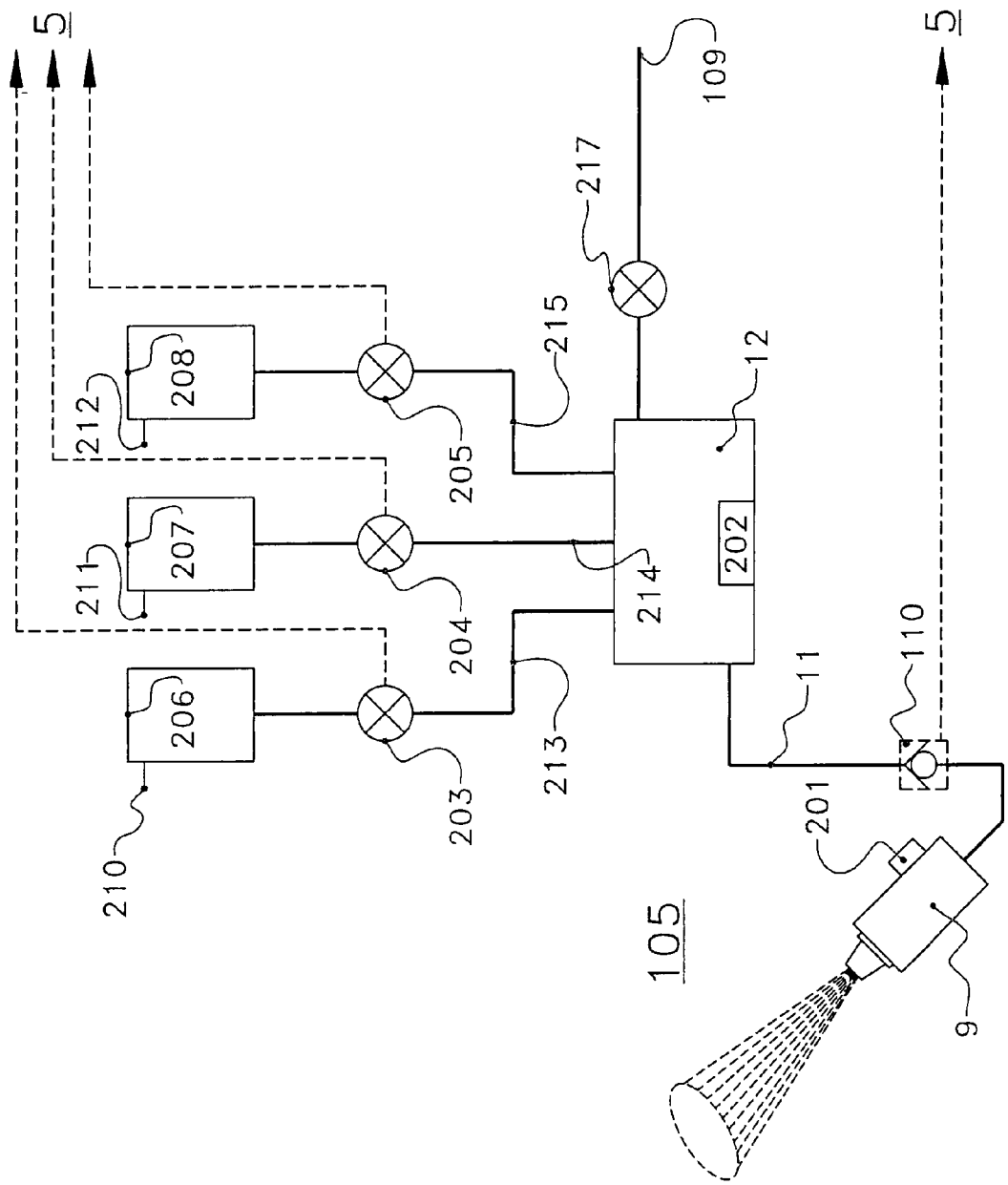
FIG. 4 shows diagrammatically an embodiment of a fluid-applying device.

In FIG. 4 the fluid-applying device is shown diagrammatically. The fluid-applying device comprises a pressure vessel 12, in which the fluid to be applied is stored, as well as a line 11 leading the fluid to the spraying element 9. Valves 203, 204, 205 controlled by the control unit 5 are included in lines 213, 214, 215. The pressure vessel 12 is connected to fluid reservoirs 206, 207, 208 via said lines 213, 214, 215. To the pressure vessel 12 there is connected a line 109 via which overpressure can be applied to the pressure vessel 12 by controlling a valve 217 included in said line in such a way that said valve is opened. The overpressure is applied to the fluid reservoirs 206, 207, 208 via supply lines 210, 211, 212. The overpressure that is present in the pressure vessel 12 preferably amounts to three atmosphere. A valve 110 is included in the supply line 11 to the spraying element 9. The flow of fluid to the spraying element 9 can be blocked or released by means of the valve 110. The valve 110 may be designed for example as an electromagnetic valve. There are provided one or more detectors 201, 202 that detect the functioning of the applying device.

Cow related treatment data may be inputted into the control unit 5 by means of the keyboard 6. With the aid of the animal identification system 10 it is thus possible inter alia to set per cow the composition of the fluid to be applied. If desired, the overpressure, the duration of the treatment and the like may also be adapted in dependence on the inputted data.

For applying a fluid to the teat, the control unit 5 moves the fluid-applying member 9 from an inoperative position to a fluid application position.

The invention relates in particular to the application of a fluid after the milking, i.e. after the teat cups have been disconnected. According to the invention, the control unit 5 moves the fluid-applying member 9 to the fluid application position only with the aid of position data obtained prior to the milking, which position data are required for connecting the teat cups to the teats of the cow. For this purpose the control unit activates the position-measuring device prior to the connection for obtaining the position signal that corresponds to the teat position prior to the milking. Alternatively, the position-measuring device may be activated permanently. If said position is used for moving the fluid-applying member 9 to the fluid application position, a quick and still accurate way of applying the fluid appears to be obtained. With some cows the position of the teats does not change during the milking and, consequently, the position data obtained prior to the milking can be used without any problem for controlling the fluid-applying member. However, with some cows or cow species it is found that the position of the teats does change during the milking.

According to the invention, this can be taken into account by the fact that the control unit 5 comprises a (non-shown) calculating device, as a result of which the control unit is suitable for performing an arithmetic operation on the position signal (relating to the teat position prior to the milking), the control unit being suitable for moving the fluid-applying device, consequently including the fluid-applying member, with the aid of the arithmetically operated position signal. By means of the keyboard 6 animal related data can be inputted per cow or per group of cows or per cow species in order to select a correct arithmetic operation.

Figure 5:
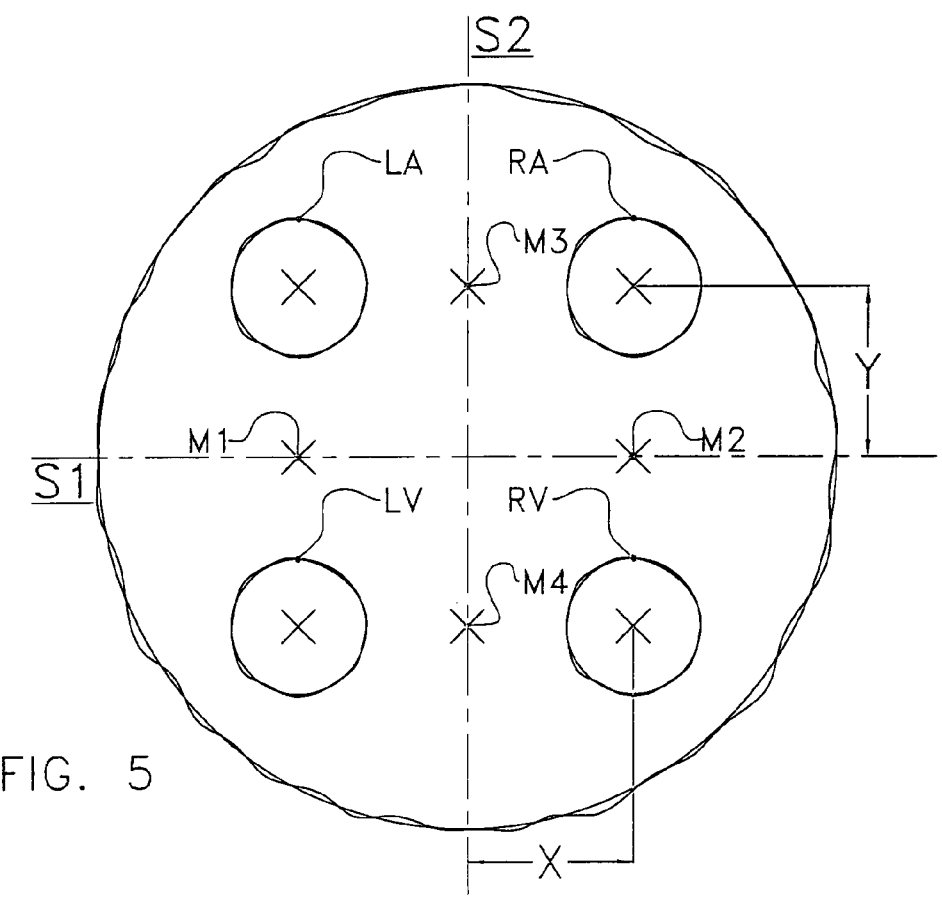
FIG. 5 shows a cross-sectional view of the teats of an udder, and the perpendicular distances X and Y from the teats to the planes of symmetry S2 and S1.

With a dairy animal having a left rear teat LA (FIG. 5) and a right rear teat RA and having a left front teat LV and a right front teat RV, the position-measuring device generates four relevant teat position signals that correspond to the teat positions prior to the milking. On the basis of the four teat position signals the calculating device determines a first centre M1 between the left teats, a second centre M2 between the right teats, a third centre M3 between the rear teats and a fourth centre M4 between the front teats. The calculating device further determines a first plane of symmetry S1 comprising the first centre M1 and the second centre M2, and a second plane of symmetry S2 comprising the third centre M3 and the fourth centre M4, the planes of symmetry extending at any rate at least substantially parallel to the teats. The control unit, comprising the calculating device, is suitable for determining a distance from the teat positions to one plane of symmetry or for determining the distances to two planes of symmetry. By determining the perpendicular distance (X and/or Y) between a teat position and a relevant plane of symmetry, the change of the teat position during the milking can be taken into account in a simple manner. According to the invention, this is achieved by performing a multiplication of said distance by a factor lying between approximately 0.7 and approximately 0.95 for obtaining the arithmetically operated position signal. Performing as an algorithm a multiplication of the distance by a factor can be chosen by the control unit in dependence on the identified animal. A value lying between approximately 0.8 and approximately 0.85 appears to be workable with the customary dairy cows.

The application of fluid takes place as follows. The calculating device, constituting part of the control unit 5, has performed an arithmetic operation on the position signals obtained prior to the milking of the cow and corresponding to the positions of the teats. By means of said arithmetically operated position signals the robot arm 3 (animal related action device), in which the spraying element 9 (action member) is disposed, is moved by the control unit 5 from an inoperative position to the first arithmetically determined fluid application position (operative position). In the embodiment chosen, a rear teat constitutes the first teat to be treated. After the robot arm 3 has been positioned, the valve 110 is opened for a very short while, so that the relevant teat is enveloped at that moment by a conical atomization pattern of fluid. Owing to the fact that the conical atomization pattern is directed forwardly and upwardly relative to the end of the robot arm 3, spraying fluid is prevented from getting into the teat cups. Subsequently, the robot arm 3 is moved to a second arithmetically determined fluid application position. In the embodiment chosen, the not yet treated rear teat constitutes the second teat to be treated. After the robot arm 3 has been positioned, the valve 110 is again opened for a very short while. The front teat located opposite the latest treated rear teat and the other front teat are successively treated in the same manner. Of course, another sequence of treating the teats is possible.

The device is provided with a detector for determining an animal related parameter and for emitting a parameter signal corresponding to the determined animal related parameter. In the embodiment shown, said detector is integrated in the position-measuring device 8, but it will be obvious that the detector may also be constituted by other, separate devices. The control unit is suitable for controlling, partially with the aid of the parameter signal, the movement of the robot arm 3 (animal related action device), comprising the spraying element 9 (action member) for spraying the fluid on the teat of the dairy animal after the milking and/or for controlling, partially with the aid of the parameter signal, the connection device for connecting a teat cup to the teat of the dairy animal, from the inoperative position to the spraying position (operative position) after the milking and for controlling the spraying element 9. Many variants of parameter detectors are possible: spray pattern detector, teat condition detector, teat orifice condition detector, etcetera.

The spray pattern detector is suitable for detecting a spray pattern originating from the spraying device and for emitting a spray pattern signal. The control unit is suitable for controlling, partially with the aid of the spray pattern signal, a movement of the spraying device from an inoperative position to the spraying position after the milking. This results in an increased reliability of the device. The control unit controls the spraying element. The control comprises the positioning in all possible spatial directions of the spraying element per se as well as the selection of a suitable flow of fluid (pulsating or continuous, temperature, pressure level, spread or rather focused, duration of time, type of fluid, etcetera), originating from an activated spraying element. The control unit is further suitable for activating a warning signal. The latter aspect is relevant as soon as the control unit determines that the spray pattern does not meet the requirements. By means of signals the farmer's attention is drawn to the not well functioning spraying element, so that he is able to take adequate action. In this context possible signals are light and/or sound signals and/or text signals on for example a receiver for electronic signals, such as a mobile telephone.

In the embodiment shown, the position-measuring device remains active also during the spraying of the fluid and thus detects a spray pattern originating from the spraying device. In this manner it is possible to check, by also detecting the teat, whether the spray pattern touches the teat. Corresponding signals may be emitted to the control unit for the purpose of performing correcting actions, if required.

It will further be obvious that the above-mentioned embodiment of the fluid-applying device may not only be used in a way in which it is integrated with the device for (automatically) milking animals, but may also be used separately in a device for (automatically) milking animals.

Owing to the presence of reservoirs 206, 207, 208, it is possible to apply by means of the device fluids with different chemical and/or physical properties, the control unit selecting, for example depending on the determined animal identity, teat related data and the like, a fluid to be applied having a particular chemical and/or physical property. In a non-shown alternative embodiment, the device is provided with a heating and/or cooling device for setting the temperature of the fluid. Also in this case it is possible to set the temperature individually per cow.

The detector 201, 202 for detecting the functioning of the fluid-applying member is connectable to the control unit, so that action can be taken in dependence on the detection result. The detector 201 may comprise for example a stock detector for detecting the stock of fluid and for emitting a stock signal. The detector 201 may further detect a stock of fluid in the spraying line 11. The detector passes a fluid stock signal to the control unit 5. It is pointed out that these detectors may also be used for applying a fluid to the teat at an other point of time than after the milking, for example also for applying a cleaning fluid prior to the milking.

A fluid detector, in the chosen embodiment integrated in the position-measuring device 8, comprises a laser apparatus for directing a laser beam to the teat, a laser beam detector for detecting the laser beam reflected by the teat and for emitting a laser beam signal, and a computer loaded with laser-beam-comparing software for comparing the laser beam signal with a previously stored reference criterion and for emitting a comparison signal forming at least a part of the fluid signal which is indicative of the comparison result. Alternatively or additionally, the fluid-applying device may be provided with an picture-recording device, for example a camera, for recording a picture of the teat and with a computer loaded with image comparing software for comparing the recorded picture with a previously stored reference criterion and for emitting a comparison signal which is indicative of the comparison result.

The position-measuring device 8 may be used for detecting the top of a teat (although an other device may be used as well for this purpose). The fluid detector present is suitable for determining the distance, measured from the top of the teat, over which the fluid has been applied to the teat, and for emitting a fluid signal to the control unit, the emitted fluid signal comprising data in relation to the measured distance. Said distance, measured from the top of the teat, is compared in the calculating device with a threshold distance in order to determine whether the fluid has been applied to a sufficiently large area of the teat. It has been found that a threshold distance of ⅔ of the measured teat length is a reliable criterion for all cows.

In order to be able to detect correctly the presence of fluid on the teat, in a non-shown embodiment of a device according to the invention, the device is provided with a colorant-adding device for adding a colorant to the fluid, and the fluid detector comprises a color detector (preferably constituted by the position-measuring device) for measuring a color of the teat and for emitting a color signal, which color signal forms at least a part of the fluid signal. The control unit is suitable for controlling the fluid-applying member partially with the aid of the color signal. The detection of the presence of fluid can take place in an accurate and simple manner by color measurement.

In a non-shown alternative or additional embodiment, the device is provided with a glossy-substance-adding device for adding a glossy substance to the fluid, and the fluid detector (preferably integrated with the position-measuring device) comprises a gloss-measuring device for measuring a gloss of the teat and for emitting a gloss signal, which gloss signal forms at least a part of the fluid signal. It is pointed out here that the colorant adding device or the glossy-substance-adding device may be included in one of the reservoirs 206, 207, 208. Also here it is pointed out that such adding devices may be used for applying a fluid prior to or after the milking.

Other detectors for checking whether a fluid is applied correctly to the teat of a cow may be constituted by a drop detector for detecting a drop of the fluid on the top of the teat of the dairy animal and for emitting a drop signal, which drop signal forms at least a part of the fluid signal. Said drop detector may be integrated with an image-recording device or a laser apparatus and is preferably integrated with the position-measuring device.

When a teat is in excellent condition, a spraying treatment needs in fact not to be carried out. According to the invention, this is achieved by using a teat condition detector (constituted by the position-measuring device in the embodiment shown) for detecting a teat condition of the teat and for emitting a teat condition signal to the control unit 5. Alternatively or additionally, the device may be provided with a (separate) teat orifice condition detector for detecting a teat orifice condition of the orifice of the teat and for emitting a teat orifice condition signal to the control unit 5.

The device is suitable for performing the application of the fluid to the teat in various ways of performing, the control unit being suitable for selecting one of the ways of performing with the aid of one or more of the aforementioned signals. Such a way of performing may comprise the repeat application of the fluid in the same way of performing. If desired, the way of performing may comprise first applying, at least once, fluid to the teat in a first way of performing and subsequently applying, at least once, fluid to the teat in a second way of performing, the first and the second way of performing differing from each other. In this context may be taken into account applying a fluid at a different temperature, prolonged spraying of the fluid, applying a different fluid and the like.

Although the invention has been described in the foregoing with reference to a spraying element as a fluid-applying member, it will be obvious that other animal related action members may be applied as well.

Figure 6:
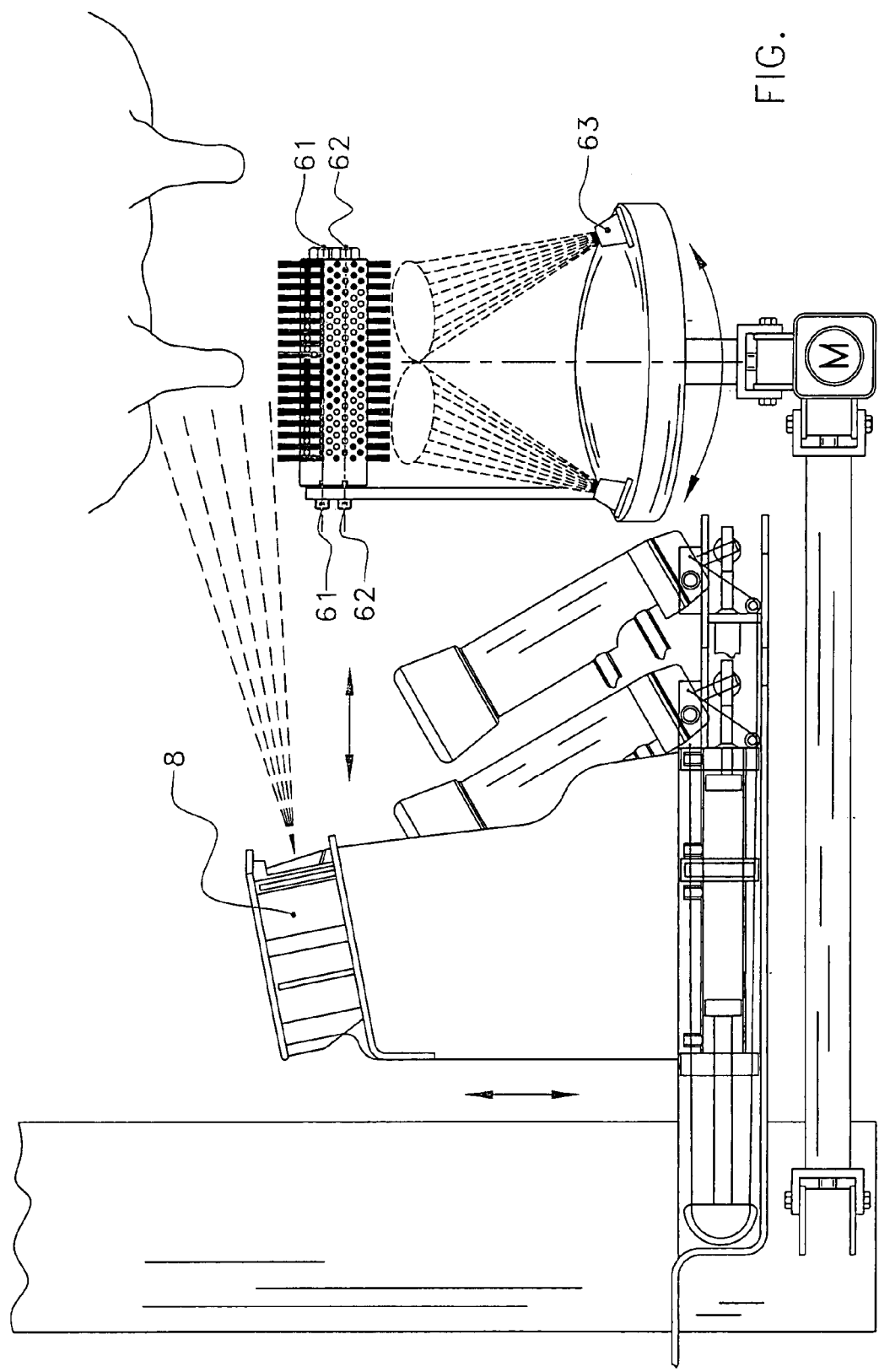
FIG. 6 shows a second embodiment of a fluid-applying device according to the invention.

FIG. 6 shows diagrammatically an embodiment of a fluid-applying member having a first brush or roller 61 and a second brush or roller 62. Each brush 61, 62 is rotatable about an at least substantially horizontal first axis respectively second axis, the first and the second axis extending at least substantially parallel to each other. Between the two brushes there is provided a teat-receiving space for receiving the teat. In the embodiment shown, there is provided a spraying element 63 under the brushes, although this is not necessary. In order to obtain a correct positioning of the brushes relative to the teat, the arrangement is such that the main detecting direction of the teat detector (in the embodiment shown the position-measuring device) is capable of being brought at least substantially parallel to a horizontal axis of the brushes, preferably a horizontal axis located in the plane between the brushes.

Figure 7:
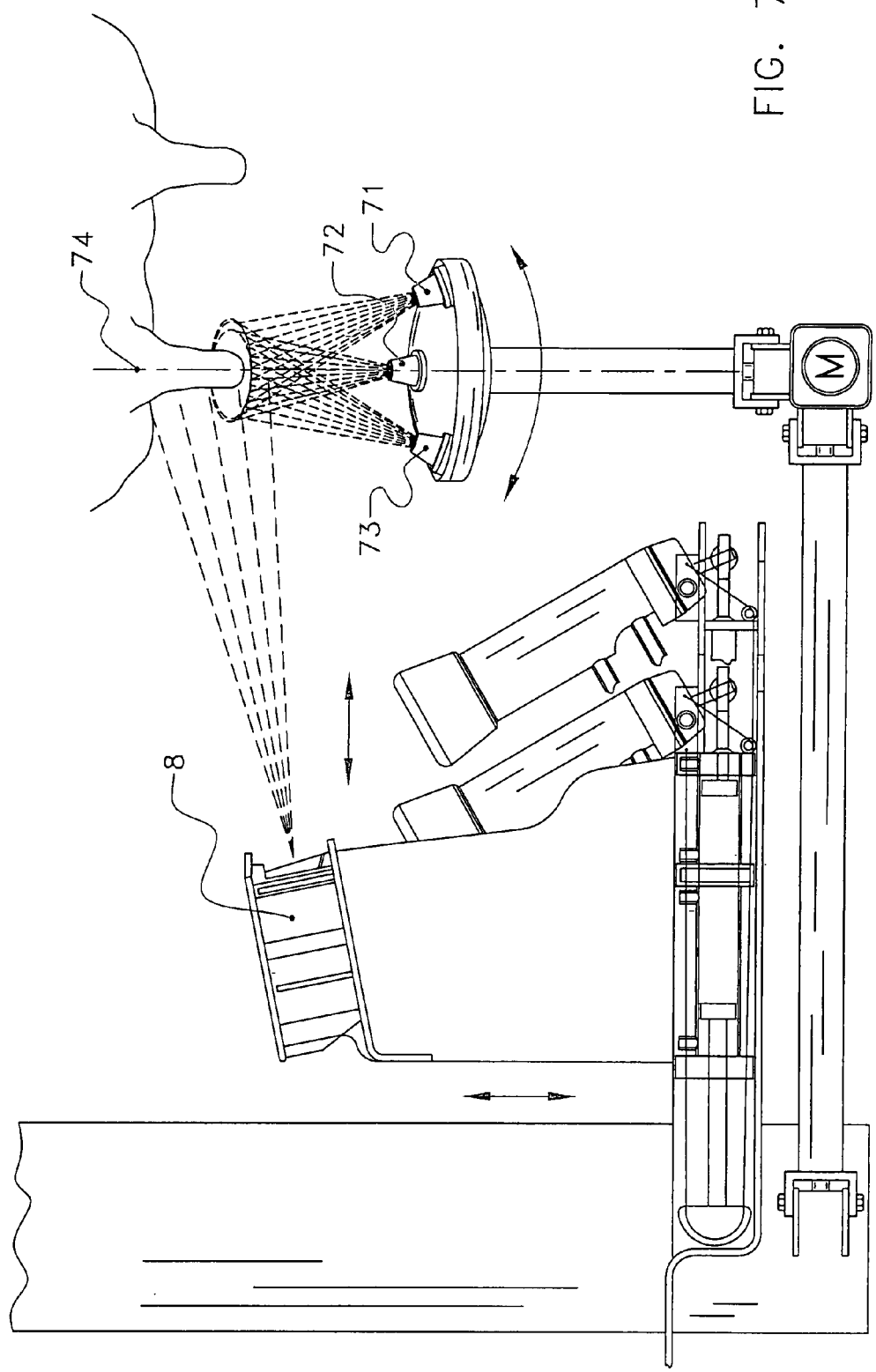
FIG. 7 shows a third embodiment of a fluid-applying device according to the invention.

FIG. 7 shows a further alternative embodiment of a fluid-applying member comprising at least three spraying elements 71, 72, 73 disposed about an axis 74 extending through the longitudinal direction of the teat. If desired, the spraying elements are rotatable under the control of the control unit about an axis extending through the longitudinal direction of the teat in order to achieve a sufficiently reliable fluid application. It will be obvious that any other number of spraying elements than the number of three in the embodiment shown may be applied within the scope of the invention.

Within the scope of the present invention the term fluid is also understood to include powders and the like. In addition, although the invention has been described with reference to the embodiment of picture and or image comparing software it will be appreciated by a person skilled in the art that other comparing means to establish the presence of the result of a performed animal related action may be used. For example, said comparing means can use measurements using ultrasound, infrared, temperature, electrical resistance, color, moisture, odour, and other electromagnetic or physical or chemical means for establishing the presence of the result of a performed animal related action. The step of comparing may be performed during or after performing an animal related action, or both.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for determining the expected teat positions of a dairy animal after milking thereof comprising;
   a position-measuring device for determining pre-milking positions of the teats prior to the milking of the dairy animal;
   a control unit comprising an algorithm for computing on the basis of the pre-milking positions and without post-milking measurement, expected post-milking positions for the teats, the expected post-milking teat positions being different from the pre-milking teat positions; and
   an animal related action device comprising an action member for performing a non-milking animal related action on the dairy animal after the milking, the control unit controlling the animal related action device on the basis of the expected post-milking positions for the teats.

2. The device as claimed in claim 1, wherein the algorithm computes the post-milking teat positions by locating a point of symmetry of at least two teats and scaling a distance from the pre-milking teat positions to the point of symmetry.

3. The device as claimed in claim 1, the dairy animal having a left rear teat, a right rear teat, a left front teat and a right front teat
   wherein the control unit comprises an algorithm for determining a first plane of symmetry between front and rear teats and for determining a second plane of symmetry between the left and right teats.

4. The device as claimed in claim 3, wherein the control unit determines a distance from a teat to the first plane of symmetry or the second plane of symmetry.

5. The device as claimed in claim 4, wherein the control unit performs a multiplication of the distance by a factor for obtaining an arithmetically operated position signal.

6. The device as claimed in claim 5, wherein the factor is between approximately 0.7 and approximately 0.95.

7. The device as claimed in claim 5, wherein the control unit controls a movement of the animal related action device from an inoperative position to an operative position after the milking, with the aid of the arithmetically operated position signal, and further controls the action member in the operative position.

8. The device as claimed in claim 5, wherein the control unit is suitable for controlling an action member for performing an animal related action on the dairy animal in various ways and wherein the control unit is suitable for selecting one of the ways of performing with the aid of the position signal, the arithmetically operated position signal, a parameter signal, a teat orifice condition signal, a spray pattern signal, a comparison signal or combinations of the aforementioned signals.

9. The device as claimed in claim 8, wherein the control unit selects a way of performing that comprises the repeat performance of an animal related action on the dairy animal.

10. The device as claimed in claim 8, wherein the control unit selects a way of performing that comprises first performing, at least once, an animal related action on the dairy animal in a first way of performing and subsequently performing, at least once, an animal related action on the dairy animal in a second way of performing, the first and the second way of performing differing from each other.

11. The device as claimed in claim 4, wherein the distance is a perpendicular distance between an individual teat position and a relevant plane of symmetry.

12. The device as claimed in claim 1, further comprising a connection device for connecting a teat cup to a teat of the dairy animal, the control unit controlling the connection device.

13. The device as claimed in claim 1, wherein the device further comprises a parameter detector for determining an animal related parameter and for emitting a parameter signal corresponding to the determined animal related parameter, and in that the control unit is suitable for controlling, at least partially with the aid of the parameter signal, a connection device for connecting a teat cup to the teat of the dairy animal, or a movement of an animal related action device comprising an action member for performing an animal related action on the dairy animal after the milking, from an inoperative position to an operative position after the milking and for controlling the action member.

14. The device as claimed in claim 1, wherein the device further comprises a teat orifice condition detector for detecting a teat orifice condition of an orifice of the teat and for emitting a teat orifice condition signal, and in that the control unit is suitable for controlling, at least partially with the aid of the teat orifice condition signal, a connection device for connecting a teat cup to the teat of the dairy animal, or a movement of an animal related action device comprising an action member for performing an animal related action on the dairy animal after the milking, from an inoperative position to an operative position after the milking and for controlling the action member.

15. The device as claimed in claim 1, wherein the action member comprises a spraying device comprising a spraying element for applying a fluid to the teat of a dairy animal by spraying and a spray pattern detector for detecting a spray pattern originating from the spraying device and for emitting a spray pattern signal, wherein the control unit is suitable for controlling, at least partially with the aid of the spray pattern signal, a movement of the spraying device from an inoperative position to a spraying position after the milking and for controlling the spraying element or activating a warning signal.

16. The device as claimed in claim 1, wherein the device is provided with an image-recording device for recording an image of a part of the dairy animal on which an animal related action has been performed and with a computer loaded with image-comparing software for comparing the recorded image with a previously stored reference criterion and for emitting a comparison signal which is indicative of the comparison result, and in that the control unit is suitable for controlling, at least partially with the aid of the comparison signal, a movement of an animal related action device comprising an action member for performing an animal related action on the dairy animal after the milking, from an inoperative position to an operative position after the milking and for controlling the action member or activating a warning signal.

17. A method of determining the expected teat positions of a dairy animal after milking thereof, the method comprising:
    determining pre-milking teat positions of the individual teats of the dairy animal prior to milking using a position-measuring device;
    calculating on the basis of the pre-milking teat positions and without post-milking measurement, post-milking teat positions corresponding to the expected positions of the teats after milking, the expected post-milking teat positions being different from the pre-milking teat positions by using a control unit comprising an algorithm; and
    performing a non-milking animal related action on the dairy animal after the milking, the control unit controlling the animal related action on the basis of the expected post-milking positions for the teats.

18. The method as claimed in claim 17, wherein the post-milking teat positions are calculated by scaling a distance from the pre-milking teat positions to a point of symmetry.

19. The method as claimed in claim 17, the dairy animal having a left rear teat, a right rear teat, a left front teat and a right front teat, wherein the method comprises:
    determining a first plane of symmetry between the front and rear teats; and
    determining a second plane of symmetry between the left and right teats.

20. The method as claimed in claim 19, wherein the method comprises determining a distance from a teat to the first plane of symmetry or a distance to the second plane of symmetry.

21. The method as claimed in claim 20, wherein the method comprises performing as an algorithm a multiplication of the distance by a factor for obtaining an arithmetically operated position signal.

22. The method as claimed in claim 21, wherein the distance is a perpendicular distance between an individual teat position and a relevant plane of symmetry.

23. The method as claimed in claim 21, wherein the factor is between approximately 0.7 and approximately 0.95.

24. The method as claimed in claim 21, wherein the animal related action is performed using an animal related action device having an action member and the method comprises controlling, with the aid of the arithmetically operated position signal, a movement of the animal related action device from an inoperative position to an operative position after the milking, and further controlling the action member at the operative position.

25. The method as claimed in claim 21, wherein the method further comprises:
    controlling an action member for performing, in various ways, an animal related action on the dairy animal;
    selecting, with the aid of the position signal, the arithmetically operated position signal, a parameter signal, a teat orifice condition signal, a spray pattern signal, a comparison signal or combinations of the aforementioned signals, one of the ways of performing the animal related action.

26. The method as claimed in claim 25, wherein the method further comprises selecting a way of performing that comprises the repeat performance of an animal related action on the dairy animal.

27. The method as claimed in claim 25, wherein the method comprises selecting a way of performing that comprises first performing, at least once, an animal related action on the dairy animal in a first way of performing, and subsequently performing, at least once, an animal related action on the dairy animal in a second way of performing, the first and the second way of performing differing from each other.

28. The method as claimed in claim 17, wherein the method comprises connecting a teat cup to the teat of the dairy animal.

29. The method as claimed in claim 17, wherein the method further comprises:
    determining an animal related parameter and emitting a parameter signal corresponding to the determined animal related parameter; and controlling, at least partially with the aid of the parameter signal, a connection device for connecting a teat cup to the teat of the dairy animal, or a movement of an animal related action device comprising an action member for performing an animal related action on the dairy animal after the milking, from an inoperative position to an operative position after the milking, and controlling the action member at the operative position.

30. The method as claimed in claim 17, wherein the method further comprises:

detecting a teat orifice condition of an orifice of the teat and emitting a teat orifice condition signal; and controlling, at least partially with the aid of the teat orifice condition signal, a connection device for connecting a teat cup to the teat of the dairy animal, or a movement of an animal related action device comprising an action member for performing an animal related action on the dairy animal after the milking, from an inoperative position to an operative position after the milking, and controlling the action member at the operative position.

31. The method as claimed in claim 17, wherein the non-milking animal related action comprises:

applying a fluid to the teat of the dairy animal by spraying by means of a spraying device;

detecting a spray pattern of the spraying device and emitting a spray pattern signal;

controlling, at least partially with the aid of the spray pattern signal, a movement of the spraying device from an inoperative position to a spraying position after the milking; and controlling the spraying element or activating a warning signal.

32. The method as claimed in claim 17, wherein the method further comprises:

recording an image of a part of the dairy animal on which an animal related action has been performed;

comparing the recorded image with a previously stored reference criterion and emitting a comparison signal indicative of the comparison result;

controlling, at least partially with the aid of the comparison signal, a movement of an animal related action device comprising an action member for performing an animal related action on the dairy animal after the milking, from an inoperative position to an operative position after the milking; and controlling the action member or activating a warning signal.

* * * * *